(12) United States Patent
Eberle et al.

(10) Patent No.: US 7,353,905 B2
(45) Date of Patent: Apr. 8, 2008

(54) METHOD FOR ACTUATING A REVERSIBLE VEHICLE OCCUPANT PROTECTION MEANS IN A MOTOR VEHICLE

(75) Inventors: Walter Eberle, Hochdorf (DE); Wolfgang Hinrichs, Filderstadt (DE); Rainer Justen, Altdorf (DE); Bernd Mammel, Herrenberg (DE); Hans Roehm, Wildberg (DE); Guido Villino, Leonberg (DE); Markus Woldrich, Ditzingen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 11/281,060

(22) Filed: Nov. 16, 2005

(65) Prior Publication Data

US 2006/0076178 A1 Apr. 13, 2006

Related U.S. Application Data

(63) Continuation of application No. 10/476,549, filed as application No. PCT/EP02/03980 on Apr. 10, 2002, now Pat. No. 7,178,622.

(30) Foreign Application Priority Data

May 2, 2001 (DE) ............................... 101 21 386

(51) Int. Cl.
*B60R 21/00* (2006.01)
(52) U.S. Cl. ...................................... 180/271; 180/282
(58) Field of Classification Search ................ 280/734, 280/735; 180/271, 274, 282; 701/45, 91; 342/72
See application file for complete search history.

(56) References Cited

U.S. PATENT DOCUMENTS 4,258,931 A 3/1981 Lee et al.
5,328,255 A * 7/1994 Isella .......................... 303/140

(Continued)

FOREIGN PATENT DOCUMENTS

DE 4200061 7/1993

(Continued)

OTHER PUBLICATIONS

Search Report, Aug. 24,2005, EPO.

(Continued)

*Primary Examiner*—Ruth Ilan
(74) *Attorney, Agent, or Firm*—Crowell & Moring LLP

(57) ABSTRACT

The invention relates to a method for actuating a reversible vehicle occupant protection means in a motor vehicle having a driving state sensor system and a reversible vehicle occupant protection means. The reversible vehicle occupant protection means can be triggered before the collision time and as a result moved into an effective position. For this purpose, the driving state data are monitored with respect to a state of emergency braking, and when the state of emergency braking is detected the vehicle occupant protection system is actuated. In addition, a state of oversteering and a state of understeering are determined by the data processing device. The reversible vehicle occupant protection system is actuated when the data processing device detects the state of emergency braking and/or the state of oversteering and/or the state of understeering.

13 Claims, 1 Drawing Sheet

U.S. PATENT DOCUMENTS

| | | | |
|---|---|---|---|
| 5,446,657 A * | 8/1995 | Ikeda et al. .................... 701/41 |
| 5,605,202 A * | 2/1997 | Dixon ........................ 180/268 |
| 5,787,377 A | 7/1998 | Watanabe et al. |
| 6,003,959 A * | 12/1999 | Katayose et al. ........... 303/146 |
| 6,033,039 A * | 3/2000 | Dieringer ................. 303/114.3 |
| 6,186,261 B1 | 2/2001 | Stocker et al. |
| 6,257,363 B1 | 7/2001 | Midorikawa et al. |
| 6,266,599 B1 | 7/2001 | Van Zanten et al. |
| 6,330,734 B1 | 12/2001 | Cho ........................... 16/376 |
| 6,343,810 B1 * | 2/2002 | Breed ...................... 280/730.2 |
| 6,374,168 B1 * | 4/2002 | Fujii .......................... 701/45 |
| 6,415,215 B1 * | 7/2002 | Nishizaki et al. ............. 701/70 |
| 6,758,495 B2 * | 7/2004 | Brambilla et al. .......... 280/806 |

FOREIGN PATENT DOCUMENTS

| | | |
|---|---|---|
| DE | 19524358 | 12/1996 |
| DE | 19708508 | 3/1998 |
| DE | 19811865 | 9/1999 |
| DE | 19961799 | 7/2001 |
| DE | 10005010 | 8/2001 |
| DE | 10029061 | 1/2002 |
| EP | 0430813 | 6/1991 |
| EP | 0649776 | 4/1995 |
| EP | 0747272 A2 | 12/1996 |
| EP | 0800970 B1 | 12/2001 |
| JP | 9272401 | 10/1997 |
| JP | 2000052925 | 2/2000 |
| JP | 2001055166 | 2/2001 |
| JP | 2001088744 | 4/2001 |

OTHER PUBLICATIONS

Search Report, Aug. 8,2005, EPO.

Japenese Office Action dated Feb. 2, 2006, and English translation.

* cited by examiner

METHOD FOR ACTUATING A REVERSIBLE VEHICLE OCCUPANT PROTECTION MEANS IN A MOTOR VEHICLE

This application is a continuation of application Ser. No. 10/476,549, filed on May 13, 2004, and entitled "Method for Actuating a Reversible Vehicle Occupant Protection Means in a Motor Vehicle", which is herein incorporated by reference.

BACKGROUND AND SUMMARY OF THE INVENTION

The invention relates to a method for actuating a reversible vehicle occupant protection means in a motor vehicle.

In contemporary motor vehicles, restraint means such as seatbelts and airbags which can be actuated are used to alleviate the consequences of accidents for a vehicle occupant. Methods for actuating these restraint means in a motor vehicle are known from practice and from a large number of publications.

In addition to the current restraint means such as airbags and safety belts with seatbelt pretensioners there are a series of further vehicle occupant protection means which can be actuated and which bring about a restraining effect and/or an energy-absorbing effect in order to protect a vehicle occupant when there is a collision. Examples of such vehicle occupant protection means are movable impact bodies, cushions and headrests whose size, hardness, shape and position can be changed by an actuation means. In addition to these vehicle occupant protection means, in order to alleviate the severity of accidents it is possible to provide further protection means which can be actuated and which alleviate the consequences of accidents for a vehicle occupant by virtue of the fact that the occupant is positioned, that is to say he is moved into a position which is favorable with respect to an accident. The means for positioning the vehicle occupant are, for example, an electric seat adjustment means, a headrest adjustment means, a seatbelt pretensioner and a movable cushion element.

In order to alleviate the consequences of accidents in motor vehicles it is also possible to provide protection means which can be actuated and which also serve the purpose of protecting other parties in collision, for example protecting pedestrians and cyclists. Examples of this are adjustable engine hoods, movable fenders and impact elements on the outer skin of a vehicle which have an adjustable hardness. Further protection means which can be actuated are the ride level control means and the braking and steering system by means of which an impact can be optimized in the direction of a lower degree of severity of injury for vehicle occupants and/or other parties in collisions. These means are not understood below as vehicle occupant protection means in the sense of the present invention.

When protection means for alleviating the consequences of accidents in road traffic are actuated, it is possible to distinguish between preventive measures, which are taken before an accident, and acute measures which are taken after an accident has been detected. The invention relates to the means of actuating protection means as a preventive measure.

DE 19524358 C1 discloses that the hazard warning light system, an impact protection device and a seatbelt pretensioner are actuated when there are abrupt full braking operations, taking into account the speed of the vehicle. It is known to trigger safety devices with a preventive effect during a panic braking operation. For example, the seatbelt is preventively tightened during a panic braking operation which is detected.

U.S. Pat. No. 4,258,931 describes a reversible protection system in the form of an airbag for a motor vehicle which is actuated in anticipation of a collision as a function of the brake pressure. For this purpose, a pressure sensor which senses the hydraulic pressure and by means of which an emergency situation is inferred is provided in the hydraulic circuit of the brake system. In the case of an emergency situation, a valve is actuated in order to cause the airbag to be filled. If the emergency situation does not lead to an accident, the driver vents the airbag manually using a switch. If an accident takes place without an emergency situation having been detected in anticipation of the accident, the airbag is triggered by means of accident-detecting sensors.

The genus-forming DE 10005010 A1 discloses a method for actuating a reversible vehicle occupant protection system in a motor vehicle, in which case driving state data is sensed using a sensor system. The driving state data is monitored with respect to a state of emergency braking, and when the state of emergency braking is determined the vehicle occupant system is triggered before the collision time and moved into an effective position. In addition, this genus-forming document discloses that a critical traffic situation is determined from the driving state data relating to the steering angle, wheel speed, yaw rate and acceleration.

DE 19708508 which relates to a method for sensing driving state data discloses that the state of oversteering is determined by means of an evaluation of the altitude angle.

Furthermore, DE 4200061 A1, which is also concerned with determining driving state data, discloses that the altitude angle is determined from the wheel speeds, the yaw rate and the lateral acceleration.

The object of the invention is to reduce the consequences of accidents in road traffic. This object is achieved according to the invention.

An advantage of the method according to the invention is that many of the accident situations are already detected before the collision by using the sensor system which is already present in the vehicle, without making additional use of ambient data, and that on the basis of this the safety of the vehicle occupant(s) is significantly increased by actuating reversible protection systems.

The sensor system for sensing driving state data comprises, for example, a steering angle sensor, a pedal travel sensor, a brake pressure sensor, wheel speed sensors, acceleration sensors and a yaw rate sensor. The steering angle sensor senses the steering angle at the steering wheel, this steering angle constituting, as does the pedal travel, a setpoint variable of the driving operation. In contrast, for example the sensed accelerations, the yaw rate and the wheel speeds are actual variables of the driving operation. A reversible vehicle occupant protection means is a means whose purpose is to alleviate the stress on a motor vehicle occupant in the case of a collision, the protection means being repeatedly moved from the initial state into an effective state, and can be returned from the effective state into its initial state.

Emergency braking occurs if a braking process takes place with at least one feature which indicates a hazardous or emergency situation. This is the case if this feature (these features) lies (lie) significantly outside a predefinable value range. The state of emergency braking is determined by using at least one of the parameters of the brake pressure, speed of the activation of the brake pedal and speed of the retraction of the accelerator pedal to evaluate the braking operation.

As an alternative to an emergency braking operation which is brought about by the driver, emergency braking can be carried out in an automated fashion on the basis of the sensing of the environment. A signal which indicates that automated emergency braking, for example the control signal for the triggering of the emergency braking operation, can also be used to carry out the method according to the invention.

The state of understeering of the vehicle signifies that the radius of the setpoint path of the vehicle which is predefined by the steering angle is smaller than the radius of the path which is actually traveled through by the vehicle. In contrast, oversteering of the vehicle means that the radius of the setpoint path which is predefined by the steering angle is larger than the radius of the path which is actually traveled through. The setpoint path which is predefined by the steering angle is to be understood as the trajectory of the vehicle, which comes about when the vehicle travels with the steering angle to be considered and at such a low speed that the lateral forces can be ignored in comparison with the longitudinal forces. The driving state data can be used to determine the states of understeering and oversteering.

The data processing device continuously checks whether one of the states of emergency braking, oversteering or understeering is present. If this is the case, the reversible vehicle occupant protection system is actuated, it being possible to adapt the triggering speed, the actuation speed, the hardness and the direction of effect as a function of the states of emergency braking, of oversteering and of understeering. In particular, the actuation of the vehicle occupant protection means when more than one of the states of emergency braking, of understeering and of oversteering are simultaneously present is adapted to a combined hazard, for which it is possible to provide an additional evaluation algorithm.

In addition, the direction from which a maximum hazard is to be expected is determined by means of the states of emergency braking, of oversteering and of understeering. The vehicle occupant protection system is actuated in accordance with the determined direction of the hazard in such a way that the protective effect is provided in accordance with the direction of maximum hazard. Considering the states of emergency braking, of oversteering and of understeering together it is possible, when more than one state which indicates a hazard is present to actuate the protection system in such a way that the stress on the vehicle occupant in the case of an accident is as low as possible.

In one development of the invention, the reversible vehicle occupant protection system is actuated only if the vehicle is at a minimum speed. This has the advantage that it is possible to prevent actuation of the vehicle occupant protection systems at low speeds. It may be desired not to actuate the vehicle occupant protection systems below a predefinable speed as, at a low speed, a hazard to the vehicle occupants which may be detected by means of the driving state data is negligibly small.

In one advantageous configuration of the method, the state of emergency braking is detected by means of an intervention into the driving dynamics which is performed by a brake boosting system. This brake boosting system itself evaluates driving state variables in order to intervene in the driving dynamics as a function of the evaluation result. The intervention of the brake boosting system in the driving dynamics takes place by transmitting control signals to the actuation devices which influence the driving dynamics. These control signals of the brake boosting system can be used to detect the emergency braking operation. As an alternative to the control signals it is possible to use a different information signal which is transmitted by the brake boosting system to a data bus in order to detect the state of emergency braking. An advantage of this configuration of the method is that an emergency braking operation is detected with particularly little expenditure. On the other hand it is necessary to accept that triggering of the protection systems is associated with the algorithm of the brake boosting system.

In one further configuration of the method, the control signal of the brake light switch is used to check the plausibility of the emergency braking operation. This signal is frequently made available on a data bus in the vehicle so that no additional expenditure on cabling comes about. An advantage of the redundancy which is achieved by means of this development of the method with respect to the detection of an emergency braking operation is that the reliability of the decision when a reversible protection system is actuated is increased.

In one configuration of the method, the states of understeering and oversteering are determined by virtue of the fact that the difference formed between an angle which describes an actual change in the driving direction and the steering angle is evaluated. This evaluation may comprise a simple threshold value interrogation, the threshold value being permanently predefinable, or the threshold value can be adapted as a function of other parameters, for example the properties of the road or the loading of the vehicle. The states of oversteering and understeering can also be determined using chronologically preceding values of the travel-describing angle and of the steering angle. By means of the previous values of the angles which are determined it is possible to form the difference between two angles as a function of time and subject it to an evaluation. For example, the calculated difference in angles can be integrated over a predefinable time period, or the gradient of the difference in angles is evaluated.

The angle which describes a change in the actual direction of travel can be determined from different parameter sets. This may be used to check the plausibility of the determination of a state which leads to the triggering of a protection system. The reliability which is achieved by means of a redundant determination of a triggering state permits the protection system to be actuated at lower triggering thresholds, and thus at an earlier time. Parameter sets which can be used to determine the state of understeering may be, for example, the wheel speeds, the lateral acceleration and the wheel base, or in another example the wheel speeds, the yaw rate and the wheel base. Both parameter sets are advantageously available on a data bus system in modern vehicles. Instead of the wheel speed it is also possible to use the vehicle speed directly, it being possible to determine the vehicle speed from the wheel speeds.

With respect to the determination of the state of oversteering it it has been found that the altitude angle is a variable which is suitable for this and which directly characterizes oversteering. The altitude angle may be determined from the available parameter set of the yaw rate, lateral acceleration and one of the parameters of the wheel speeds or vehicle speed, it being in turn possible to determine the vehicle speed from the wheel speeds.

In order to additionally protect against the state of oversteering, a setpoint yaw rate is determined which is calculated from the vehicle speed and the steering angle. If the difference formed between the setpoint yaw rate and yaw rate exceeds a predefinable threshold, the state of oversteering is also inferred.

In one advantageous configuration of the method, the protection system comprises an electric seat adjustment device and/or an electric adjustment device for orifices in the vehicle and/or a reversible seatbelt pretensioner and/or an electrically adjustable impact protection device. An electric seat adjustment device and electric adjustment devices for orifices in the vehicle, for example the electrically adjustable sunroof and electrically adjustable window lifters are present at least to a certain extent in contemporary vehicles and can additionally be used for preconditioning the vehicle occupants or the vehicle at low expenditure. All the electrically adjustable protection systems have the advantage that the energy supply is provided easily via the vehicle's on-board power system, in particular electromotive drives easily permit the reversibility of the protection systems. As a result, it is possible to trigger the protection systems, while taking into account their effect on the driver and vehicle occupants, even if a hazardous situation is determined which will not lead to a collision with a high degree of certainty but merely with a certain, predefinable probability. The method according to the invention has the effect of detecting such a hazardous situation, the intention being that in a simple embodiment the method can already be carried out in contemporary vehicles without additional sensor systems and without additional actuator systems.

An advantageous embodiment of the method according to the invention for actuating a reversible vehicle occupant protection means in a motor vehicle is described below in more detail with reference to the drawing.

BRIEF DESCRIPTION OF THE DRAWINGS

The single FIGURE shows a block circuit diagram of a device for carrying out an advantageous embodiment of the method according to the invention.

DETAILED DESCRIPTION OF THE INVENTION

Figure 1:
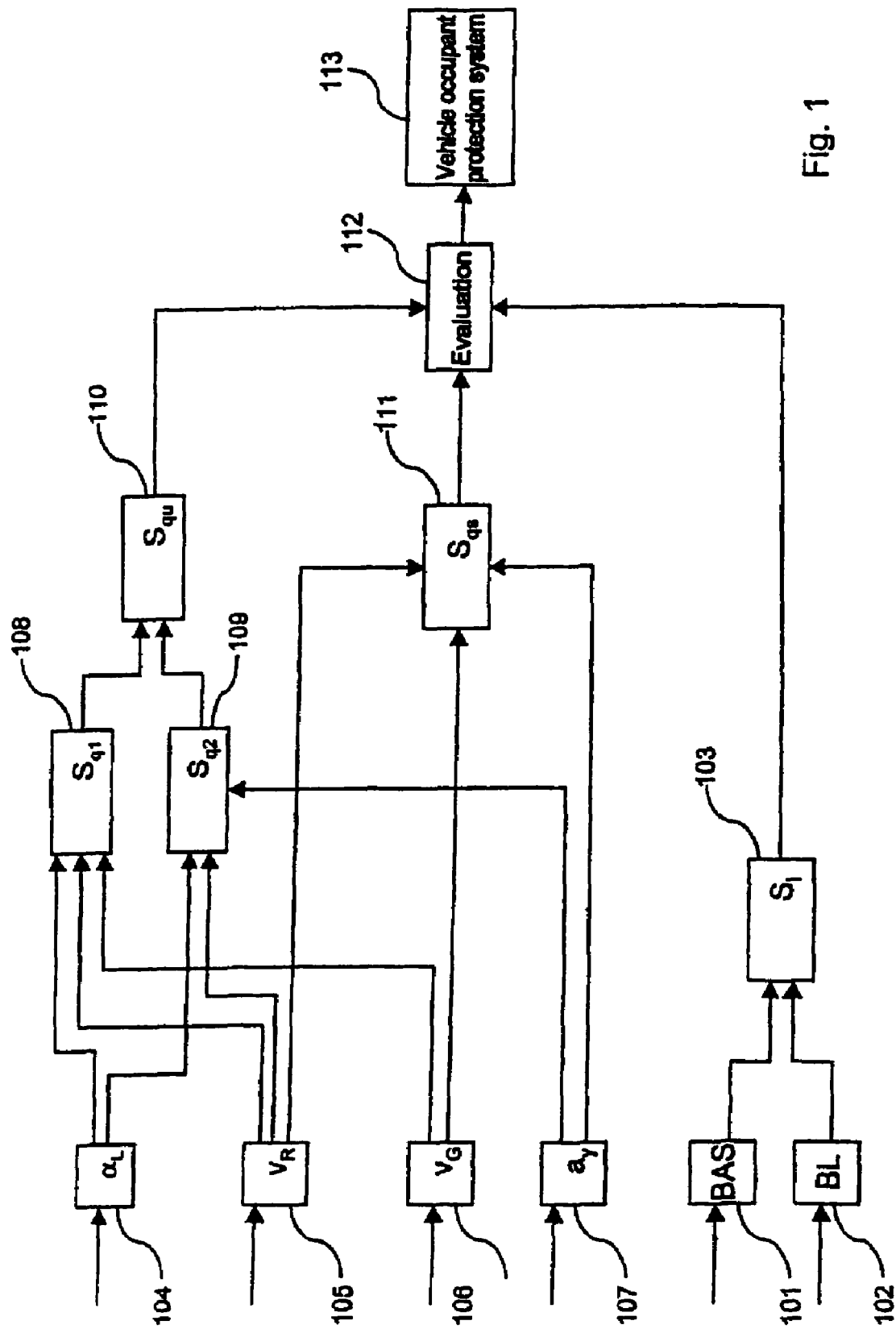

In order to actuate a reversible vehicle occupant protection means, the states of emergency braking, of understeering and of oversteering are monitored.

For this purpose, the control signal of a brake boosting system BAS and the control signal of a brake light switch BL are used as input data by the data processing device, and said signals are checked in the blocks 101 and 102 to determine whether they are active. If both signals are active, it is possible to infer emergency braking, in particular owing to the redundancy which is achieved by means of the additional use of the brake light switch signal. The presence of an emergency braking operation causes the longitudinal protection $S_1$ signal to be set to the active state in block 103. In the blocks 104 to 107, the steering angle $\alpha_L$, the wheel speeds of the four wheels $v_R$, the yaw rate $v_G$ and the lateral acceleration $a_y$, which are made available on a data bus, are sensed by the data processing device. The yaw rate $v_G$ is the simple time derivative of the yaw angle, for which reason it is frequently also referred to as yaw angle rate. The vehicle speed $v_f$ is determined from the wheel speeds $v_R$ in block 105. In an alternative embodiment of the method, it is possible for the vehicle speed $v_F$ to be sensed in block 105 instead of the wheel speeds $v_R$, and said vehicle speed $v_F$ can be used to carry out the method. If the input information of the blocks 101, 102 and 104 to 107 cannot be transferred via a data bus, it can also be sensed via signal lines.

A hazardous situation as a result of understeering is inferred in blocks 108 and 109: block 108 calculates, from the vehicle speed $v_F$ and the yaw rate $v_G$, a virtual setpoint steering angle which, in the absence of centripedal force, would lead to the vehicle moving on a path with the desired bend radius. For this calculation, the wheel base 1 of the vehicle is used, as in block 109 as an unchanging variable. Such a virtual setpoint steering angle is the Ackermann angle (see Dubbel, Tashenbuch fur den Maschinenbau [Pocket book on machine engineering], 20th edition, Q27) which is subtracted from the steering angle $\alpha_L$ in block 108. If the absolute value of the difference between the virtual setpoint steering angle and the steering angle $\alpha_L$ is greater than a predefinable value, the signal lateral-protection1 $S_{q1}$ is set to the active state. The Ackermann angle $\alpha_A$ is obtained from the specified variables in block 108 as follows: $\alpha_A = (1/v)v_G$. In parallel with the monitoring of understeering in block 108, a state of understeering is also inferred in block 109, for which purpose a different parameter set is used. The Ackermann angle is calculated from the vehicle speed $v_F$ and the lateral acceleration $a_y$ and is also subtracted from the steering angle $\alpha_L$. If the absolute value of the difference between these two angles is greater than a predefinable value, the signal lateral-protection $S_{q2}$ is set to the active state. The calculation of the Ackermann angle in block 109 by means of the specified parameter set is obtained as: $\alpha_A = (1/v^2) a_y$.

In block 110, the signals lateral-protection1 $S_{q1}$ and lateral-protection2 $S_{q2}$ are sensed and the signal lateral-protection—understeering $S_{qu}$ is activated if the two signals lateral-protection1 $S_{q1}$ and lateral-protection $S_{q2}$ are active. The state of understeering is monitored by means of two separate algorithms in the blocks 108 and 109, and the fact that the results can be checked against one another increases the detection reliability. This also permits lower thresholds to be selected for the activation of the signals lateral-protection1 $S_{q1}$ and lateral-protection2 $S_{q2}$ than would be possible with a simplified embodiment when only one of the two parameter sets used is taken into account.

In block 111, a state of oversteering is monitored in the basis of the parameters lateral acceleration $a_y$, yaw rate $v_G$ and wheel speeds $v_R$. For this purpose, the altitude angle is calculated, and if it exceeds a predefinable value the signal lateral-protection—skidding $S_{qs}$ is activated.

In block 112, the signals longitudinal-protection $S_1$, lateral-protection—understeering $S_{qu}$ and lateral-protection—skidding $S_{qs}$ are sensed and evaluated. If one of the signals is active, the corresponding protection system is actuated in block 113. If more than one of the signals is active, the protection system is actuated in accordance with the valuation in block 112. If, for example, only the signal longitudinal-protection $S_1$ is active, a collision with transmission of the impetus in the direction of travel is expected, and the vehicle occupants are preconditioned in such a way that they are stressed as little as possible in this case by virtue of the fact that the seats are displaced to the rear and the reversible seatbelt pretensioner is actuated. If, in another example, the signals longitudinal-protection $S_1$ and lateral-protection—oversteering $S_{qs}$ are active, a primary hazard from one side is inferred, and instead of the longitudinal displacement of the seat that seat which is facing the side with the hazard is displaced to the other side, or in another example all the seats are displaced to the centre.

In one alternative embodiment it is possible in block 110 to set the signal lateral-protection—understeering $S_{qu}$ to the active state if at least one of the two signals lateral-protection1 $S_{q1}$ and lateral-protection2 $S_{q2}$ are active. As a result, the redundancy from the embodiment specified above is lost. This embodiment is to be preferred if the actuated protection means is not perceived by the driver, or the vehicle occupants, or is only perceived to a low degree, and thus gives rise to only negligible and reverse effects. In this case, it is possible to dispense with more frequent triggering in order to ensure the triggering state. In this case, it would be possible to check only one of the two criteria in blocks 108 and 109.

In another alternative embodiment, the steering angle $\alpha_L$ is additionally sensed in block 111. A setpoint yaw rate is determined from the steering angle $\alpha_L$ and the wheel speeds $v_R$. If the difference formed from the setpoint yaw rate and the yaw rate exceeds a predefinable value, the signal lateral-protection—skidding $S_{qs}$ is also activated.

What is claimed is:

1. A method for actuating a reversible protection system in a motor vehicle having a sensor system and a reversible protection system which can be triggered before a collision and, as a result, moved into an effective position, comprising:
    monitoring a first control signal of a brake boosting system and a second control signal of a brake light switch with the sensor system,
    setting a longitudinal protection signal to an active state when an emergency braking operation, existing when both the first control signal and the second control signal are active, is detected, and
    triggering the reversible protection system when the emergency braking operation is detected.

2. The method as claimed in claim 1, wherein the brake boosting system brings about an intervention into a brake system in predefined critical situations by means of a control signal, and wherein the control signal of the brake boosting system or an information signal which is transmitted by the brake boosting system to a data bus is used to determine the emergency braking operation.

3. The method as claimed in claim 2, wherein the first control signal of the brake boosting system and the second control signal of the brake light switch are made available on a data bus.

4. The method as claimed in claim 2, wherein the first control signal of the brake boosting system and the second control signal of the brake light switch are checked by a data processing device.

5. The method as claimed in claim 1, wherein the protection system comprises protection means which can be actuated for the preventive protection of individuals other than occupants of the motor vehicle.

6. The method as claimed in claim 1, further comprising monitoring states of oversteering and understeering, wherein the reversible protection system is triggered when any of emergency braking operation, oversteering, and understeering is detected.

7. The method as claimed in claim 6, wherein, by means of the emergency braking operation and the states of understeering and oversteering, a direction from which a maximum hazard is expected is determined, and wherein the vehicle occupant protection system is actuated in such a way that a protective effect is provided in accordance with the direction from which the maximum hazard is expected.

8. The method as claimed in claim 7, wherein a motor vehicle speed is determined, and wherein the reversible protection system is triggered only if the vehicle is additionally at a minimum speed.

9. The method as claimed in claim 6, wherein the state of oversteering is determined by evaluating an altitude angle.

10. The method as claimed in claim 9, wherein the altitude angle is determined from wheel speeds, a yaw rate, and a lateral acceleration.

11. The method as claimed in claim 1, wherein the protection system is at least one of an electric seat adjustment device, an electric adjustment device for orifices in the vehicle, a reversible seatbelt pretensioner, and an electrically adjustable impact protection device.

12. The method as claimed in claim 1, wherein the protection system is an electric seat adjustment device and/or an electric adjustment device for orifices in the vehicle and/or a reversible seatbelt pretensioner and/or an electrically adjustable impact protection device.

13. A method for actuating a reversible vehicle occupant protection means, in a motor vehicle having a sensor system which senses driving state data, before a collision time and, as a result, moving the vehicle occupant protection system into an effective position, comprising:
    monitoring the driving state data with respect to understeering, which is critical for driving dynamics, and
    triggering the vehicle occupant protection system when the understeering, which is critical for driving dynamics, is detected,
    wherein the state of understeering is determined by means of an evaluation of the difference formed between an angle which describes a change in the actual direction of travel, and the steering angle,
    wherein the angle which describes a change in the actual direction of travel is the Ackermann angle, and
    wherein the state of understeering is monitored by means of two separate algorithms which are each based on different calculations of the Ackermann angle, and the results of the two algorithms are logically linked.

* * * * *